United States Patent [19]

McNaney

[11] 4,280,755
[45] * Jul. 28, 1981

[54] GRAPHIC SYMBOL SELECTION AND RECORDING APPARATUS

[76] Inventor: Joseph T. McNaney, 8548 Boulder Dr., La Mesa, Calif. 92041

[*] Notice: The portion of the term of this patent subsequent to Mar. 13, 1996, has been disclaimed.

[21] Appl. No.: 13,799

[22] Filed: Feb. 21, 1979

[51] Int. Cl.³ .............................................. G02F 1/33
[52] U.S. Cl. .................................................. 350/358
[58] Field of Search ............................... 350/3.7–3.74, 350/358

[56] References Cited

U.S. PATENT DOCUMENTS 4,143,948  3/1979  McNaney ............................. 350/358

Primary Examiner—William L. Sikes

[57] ABSTRACT

The invention relates to high speed means of selecting graphic symbols from an illuminated array of such symbols, whereby a series of individual images thereof will be established along a common optical axis of a recording apparatus and thereupon directed toward a predetermined line position across the surface of a light responsive display medium. More particularly, the invention includes the use of light from a laser source of radiant energy for illuminating the array of symbols and acousto-optic laserbeam deflector means utilized in a manner whereby images of the illuminated symbols are selected for viewing along the optical axis in response to voltages connected to the deflector means. Following each symbol selection a predetermined area of the display medium will be exposed to the image of the symbol under the control of secondary laserbeam reflector means.

4 Claims, 2 Drawing Figures

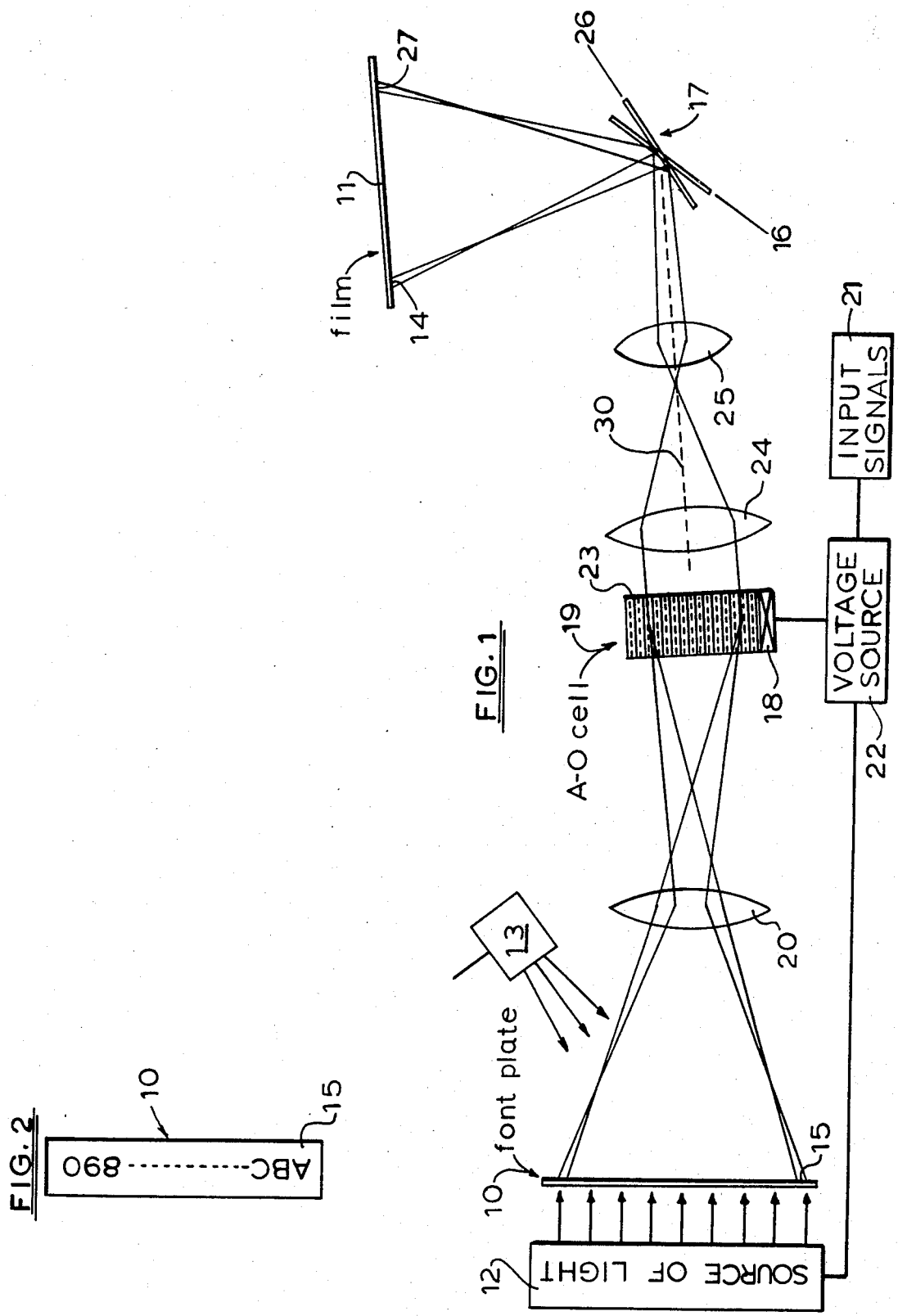

GRAPHIC SYMBOL SELECTION AND RECORDING APPARATUS

BACKGROUND OF THE INVENTION

This invention relates to a co-pending application Ser. No. 836,301 filed Sept. 26, 1977, and now Pat. No. 4,143,948, wherein individual images are selected from an array of illuminated graphic symbols, in response to voltages applied to acousto-optic laserbeam deflector means, which are thereupon directed along a common optical axis toward a predetermined display position at the surface of a record medium. The improvement herein includes the use of additional optical elements intermediate the illuminated array of graphic symbols and the light deflector means for the purpose of magnifying deflection angle requirements so as to permit the use of a more extensive array of illuminated graphic symbols.

SUMMARY OF THE INVENTION

The apparatus of this invention includes a light responsive display medium, or photosensitive film, at an information output end thereof and an array of graphic symbols, or font plate, at an opposite end. The font plate is of an opaque material having either an array of windows therein, or an array of light reflecting surface areas, each representative of a graphic symbol and light of a laser source of radiant energy is utilized to illuminate these symbols. A system of optical elements intermediate the film and the font plate, including selectively controllable light guide means employing Bragg reflecting principles, which allow the film to be exposed to a light image of any of the graphic symbols in the font plate. Before reaching the film, predetermined areas thereof will be exposed to such light images under the control of a secondary light reflector means. Therefore, it is an object of this invention to record on a light responsive medium the light images, at a high rate of speed, stemming from a large array of graphic symbols of a font plate in the apparatus. A preferred embodiment of the invention herein shows, by way of example only, an apparatus capable of meeting these objectives. The description which follows, when read in connection with the drawing hereof, will provide a better understanding of these and still other objectives and advantages of the invention.

BRIEF DESCRIPTION OF THE DRAWING

FIG. 1 shows a schematic diagram of the preferred embodiment of the invention; and FIG. 2 is a second view of the font plate identified in FIG. 1.

DESCRIPTION OF THE INVENTION

Referring now to the drawing a font plate 10 is positioned at one end of the system schematically represented in FIG. 1 and a light responsive member, or film, 11 is shown positioned at an opposite end thereof. The font plate 10 as shown in FIG. 2 will be understood as having an array of graphic symbol shaped windows, transparent or translucent to light stemming from a source of light 12, or an array of graphic symbols designed to reflect an illumination thereof from an alternate source of light 13. Either source of light 12 or 13 will be understood as being a laser source of radiant energy of a desired frequency within a range extending from ultraviolet, through the visible spectrum, to infrared. Depending upon system design requirements light output from source 12 or 13 can be controlled so as to illuminate symbols of the font plate selectively or simultaneously. In either event optical system means of the apparatus will allow a series of individual areas of the film 11 to be exposed to a predetermined series of light images of the graphic symbols of the font plate.

A description of the optical system means of the invention will be readily understood when following an optical path extending from a reference position 14 at the film 11 for the light image of the symbol A appearing at the number one position 15 of symbols in the font plate 10. The reference position 14 will have been determined by the angular position 16 of a movable mirror 17 relative to the common optical axis of the system. The viewing of the symbol A at position 15 of the font plate will have been under control of a signal voltage input to the transducer 18 of an acousto-optic cell 19, in combination with the angular magnifying effects of optical means 20. Under the control of a source 21 of input signals to a voltage source 22 a predetermined range of ultrasonic frequency voltages will have been established across the interaction medium 23 of the cell 19 so as to provide a cylindrical lensing effect therein. This provides for a selective viewing of the symbol A and also an expansion thereof to meet the optical aperture requirements of the A-0 cell 19. The symbol A will have been expanded several hundred times, for example, in one dimension when viewed through the interaction medium 23. Additional optical elements 24 and 25 of the system will effect a returning of the symbol A to its original dimensions, for example, when viewed at the reference position 14 of the film.

The selective, or simultaneous, illumination of the symbols of the font plate will be under the control of input signals 21 to the voltage source 22. When illuminated selectively a predetermined one of the symbols of the font plate will be exposed to light from either the source 12, or from a source 13, while a corresponding one of a number of predetermined acoustic wave light deflecting conditions are established in the interaction medium 23 of the A-0 cell 19. This allows an expanded image of the selectively illuminated symbol to be viewed through the medium 23. In the manner like that hereinbefore described the reference position 14 at the film will be exposed to the expanded image, but through the optical element means 24 and 25 positioned along the common optical axis 30 of the system, whereby the projecting of a reduced image of the symbol will be effected by the optical means 24 and 25 toward the film 11. Changes in the angular position of the mirror 17, extending from the position 16 to a position 26, allow exposures of the film to light images extending from the reference position area 14 to an end of line position 27 on the film 11, or display medium.

The font plate in the drawing is illustrated as containing but a limited number and type of graphic symbols as opposed to other existing possibilities. The over all number of symbols possible in the font plate, including individual dimensions thereof, is enhanced through the use of the magnifying optics 20 intermediate the font plate 10 and the A-O cell 19. And the image resolving capabilities of the optical system of the apparatus are of course related to those of the acousto-optic light deflector means, the associated circuitry and its operation. It should be understood by those skilled in the arts pertaining to the construction and application possibilities of the invention that the embodiment included herein illustrates in a very limited sense capabilities of the invention, and that the invention includes other modifications and equivalents as they may be seen by those skilled in the arts, but still being within the scope and intent of the appended claims.

I claim:

1. In a graphic symbol selection and recording apparatus:
   (a) a laser source of light;
   (b) font plate means for providing an array of graphic symbols and means for exposing graphic symbols of said array, selectively, to light from said laser source for providing any one of a plurality of individual graphic symbol shaped sources of light;
   (c) a graphic symbol display medium;
   (d) said array of graphic symbols and said display medium positioned, respectively, at first and second ends of graphic symbol shaped light beam optical paths of said apparatus;
   (e) optical means positioned along an optical axis of said apparatus intermediate said array of graphic symbols and said display medium for projecting an image of a graphic symbol selectively exposed to light from said laser source toward a predetermined graphic symbol display position at said display medium, said display position representative of a reference position at said display medium;
   (f) acousto-optic light deflector means including an interaction medium and acoustic wave generator means for establishing any of a number of different acoustic wave light deflecting conditions within said medium thereof, said interaction medium positioned intermediate said array of graphic symbols and said optical means positioned along said optical axis;
   (g) means for exposing a predetermined one of said graphic symbols of said array to light from said laser source and establishing, simultaneously, a predetermined one of said light deflecting conditions within said interaction medium for allowing said display medium to be exposed to a light image of said predetermined one of said graphic symbols through said optical means and coincident with said reference position at said display medium;
   (h) means for exposing another predetermined one of said graphic symbols of said array to light from said laser source and establishing, simultaneously, another predetermined one of said light deflecting conditions within said interaction medium for allowing said display medium to be exposed to a light image of said other predetermined one of said graphic symbols through said optical means and coincident with said reference position at said display medium.

2. The invention as set forth in claim 1, additionally including adjustable light reflector means intermediate said optical means along said optical axis and said display medium for allowing said display medium to be exposed to said light image of said other predetermined one of said graphic symbols at any one of a plurality of secondary display positions thereon in relation to said reference position.

3. The invention as set forth in claim 1, additionally including graphic symbol selection angle magnifying optical means intermediate said font plate means for providing an array of graphic symbols and said acousto-optic light deflector means.

4. In an image projection control system including a source of light representative of an array of graphical information, optical means positioned along an optical axis of said system and means for selecting predetermined portions of said array of information for an allowing of optical images of said selected portions to be viewed through said optical means and from along said optical axis, wherein the improvement comprises:
   (a) said means for selecting said predetermined portions of the information including acousto-optic light deflector means, said deflector means having acoustic wave generator means and an interaction medium positioned along said optical axis, said optical means positioned along said optical axis intermediate said array of graphical information and said interaction medium;
   (b) a source of ultrasonic frequency voltages and means for connecting voltages from said source to said wave generator means for an establishing of any of a number of different acoustic wave light deflecting conditions within said interaction medium;
   (c) means for establishing a predetermined one of said light deflecting conditions within said interaction medium, said established light deflecting condition controlling a viewing of an optical image of a predetermined one of said portions of the information through said interaction medium and said optical means and a viewing of the optical image of said one portion from along said optical axis;
   (d) means for establishing another predetermined one of said light deflecting conditions within said interaction medium, said other established light deflecting condition controlling a viewing of an optical image of another predetermined one of said portions of the information through said interaction medium and said optical means and a viewing of the optical image of said other portion from along said optical axis.

* * * * *